Aug. 10, 1926.

C. A. PETERSON

BUTTER PRINTER

Filed April 1, 1924

1,595,120

Inventor
Charles A. Peterson

Attorney

Patented Aug. 10, 1926.

1,595,120

UNITED STATES PATENT OFFICE.

CHARLES A. PETERSON, OF WEYAUWEGA, WISCONSIN.

BUTTER PRINTER.

Application filed April 1, 1924. Serial No. 703,520.

The invention relates to improvements in butter printers.

In the printing of butter it is the general practice to place in a receptacle a batch of butter, of say, 25 pounds, and to then divide said batch into a multitude of prints, ranging from 1 to 2 pounds in weight. Various types of printers have been employed, but considerable difficulty has been experienced in their use by reason of the fact that the outside prints produced from the mass of butter are not always of uniform weight and it has been necessary in the past to separately weigh these outside prints and to either add sufficient butter to these prints to make up the deficiency, or to remove surplus butter that the prints may contain.

The present invention aims to provide a butter press wherein the prints are all of a uniform weight and require no subsequent attention after the production thereof. To this end the invention more specifically comprises a press wherein the outside prints are so cut from the mass of butter that these prints must be of the same size and weight as the other prints made from said press.

Figure 1:
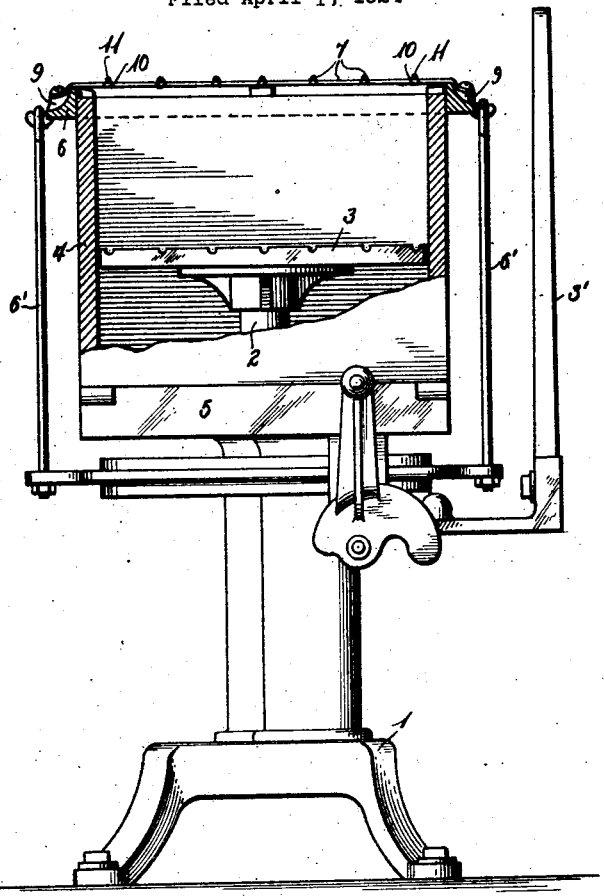
Figure 2:
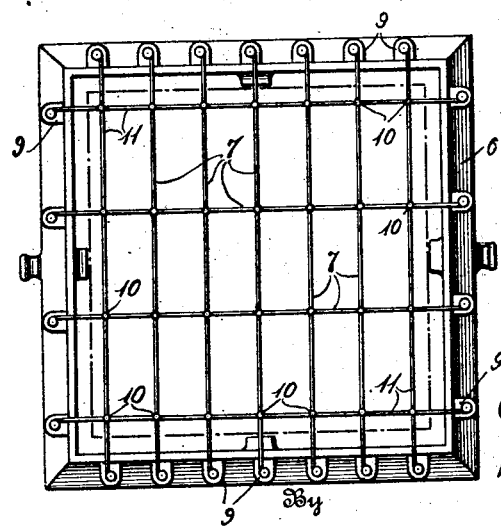

In the accompanying drawings I have shown one embodiment of this invention, in which Figure 1 illustrates a side elevation, partly in section, of my device; and, Figure 2 is a plan view of the cutting frame.

In the accompanying drawings wherein like reference characters indicate corresponding parts, the numeral 1 designates a supporting standard, in the interior of which there is a plunger 2 operated by the hydraulic power of oil or the like controlled through a suitable hand lever 3', all of which mechanism is common in this art and need not be described herein in detail. The plunger 2, however, carries the movable bottom 3 on which the butter is seated. The butter is preferably placed in a receptacle 4 and packed therein, the receptacle then being seated on the frame 5. It is retained in position by fastening studs of any convenient form and the top portion of said receptacle is removed.

When the butter in the receptacle is to be printed, I place on top of the receptacle 4 a cutting or printing means embodying a frame 6 which is secured by the fastening rods 6' to the frame 5 of the apparatus. This frame 6 constitutes the subject matter of my invention. The frame is preferably of rectangular form and is adapted to receive a plurality of longitudinal and transverse cutting wires 7. These wires are all retained in position by means of the fastening studs mounted on brackets or lugs 9 projecting from the side of the frame. The wires are drawn very taut, and, of course, are maintained in this condition throughout their use. These lateral and longitudinal wires are welded as designated by the reference character 10 at their points of intersection so there is no tendency of the wires separating when butter is being pressed which would cause the production of prints of non-uniform size. The wires are, of course, all originally spaced apart uniform distances so as to produce prints of a uniform size. A salient feature of this invention comprises the use of the outer set of wires 11 which are disposed very close to the walls of the frame 6. This construction is decidedly advantageous because when using the same the outer prints must be of a predetermined size and weight, thereby requiring no subsequent attention before packing. That is to say, there is no overrun of weight in the outside prints such as frequently occurs when using presses of this general type where the outer wires are not employed.

When the frame 6 is mounted in position and the table 3 elevated, the butter is, of course, forced from the receptacle 4 and is cut into the desired prints by the wires just mentioned. The prints may be horizontally cut after passage through this press by the use of the ordinary bow cutter, if such an operation is desirable

Having thus described my invention, what I claim is:—

A cutter frame for a butter press having a suitable frame portion, transverse and longitudinal intersecting wires carried thereby with the outer row of said wires being disposed adjacent the sides of said frame, said wires at their points of intersection being welded together.

In testimony whereof I affix my signature.

CHARLES A. PETERSON.